United States Patent
Croak et al.

(10) Patent No.: US 8,582,590 B2
(45) Date of Patent: *Nov. 12, 2013

(54) METHOD AND APPARATUS FOR PROVIDING DISASTER RECOVERY USING NETWORK PEERING ARRANGEMENTS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/567,972

(22) Filed: Aug. 6, 2012

(65) Prior Publication Data

US 2012/0300770 A1      Nov. 29, 2012

Related U.S. Application Data

(63) Continuation of application No. 12/343,112, filed on Dec. 23, 2008, now Pat. No. 8,238,353, which is a continuation of application No. 11/025,232, filed on Dec. 29, 2004, now Pat. No. 7,468,984.

(51) Int. Cl.
*H04L 12/28* (2006.01)

(52) U.S. Cl.
USPC .......................................... 370/401; 370/406

(58) Field of Classification Search
USPC .................................. 370/401, 466
See application file for complete search history.

(56) References Cited

U.S. PATENT DOCUMENTS

| | | |
|---|---|---|
| 6,215,765 B1 | 4/2001 | McAllister et al. |
| 6,219,710 B1 | 4/2001 | Gray et al. |
| 6,560,218 B2 | 5/2003 | McAllister et al. |
| 6,560,654 B1 | 5/2003 | Fedyk et al. |
| 6,614,757 B1 | 9/2003 | Rochberger et al. |
| 6,751,216 B2 | 6/2004 | Johnson et al. |
| 6,856,598 B1 | 2/2005 | Stanfield |
| 7,099,334 B2 | 8/2006 | Newell et al. |
| 7,154,901 B2 | 12/2006 | Chava et al. |
| 7,194,002 B2 | 3/2007 | Zhang et al. |
| 7,457,283 B2 | 11/2008 | Dalton et al. |
| 7,464,169 B2 | 12/2008 | Munje et al. |
| 7,468,984 B1 | 12/2008 | Croak et al. |
| 7,995,574 B2 | 8/2011 | Suri |
| 8,238,353 B2 | 8/2012 | Croak et al. |
| 2003/0043783 A1 | 3/2003 | Spencer |
| 2003/0165226 A1 | 9/2003 | Vu et al. |
| 2004/0139024 A1 | 7/2004 | So |
| 2004/0258239 A1 | 12/2004 | Gallant et al. |
| 2005/0213518 A1 | 9/2005 | Ahya et al. |
| 2006/0067249 A1 | 3/2006 | Poustchi et al. |
| 2006/0080407 A1 | 4/2006 | Rengaraju |
| 2007/0005729 A1 | 1/2007 | Cox et al. |
| 2008/0019361 A1 | 1/2008 | Suri |

*Primary Examiner* — Creighton Smith

(57) ABSTRACT

The present invention enables network providers to create peering arrangements with other providers that allow them to fail over to other networks in the event of a site failure. This invention would lower the cost to provide site diversity within a provider's network by allowing cost sharing between the provider's network and other networks. For example, when an Application Server (AS) in a network fails, the network provider can send a call to a partner's network and uses an AS in the partner's network to process the call request.

20 Claims, 5 Drawing Sheets

METHOD AND APPARATUS FOR PROVIDING DISASTER RECOVERY USING NETWORK PEERING ARRANGEMENTS

CROSS REFERENCE TO RELATED APPLICATIONS

This application is a continuation of U.S. patent application Ser. No. 12/343,112, filed Dec. 23, 2008, currently allowed, which is a continuation of U.S. patent application Ser. No. 11/025,232 filed Dec. 29, 2004 (now U.S. Pat. No. 7,468,984); both of which are herein incorporated by reference in their entirety.

The present invention relates generally to communication networks and, more particularly, to a method and apparatus for enabling disaster recovery using network peering arrangements with other network providers in packet-switched networks, e.g., Voice over Internet Protocol (VoIP) networks.

BACKGROUND OF THE INVENTION

To offer highly reliable service availability, network service providers must design their networks to support redundancy among network elements as well as site diversity. Geographical diversity is critical for instances where equipment housed in a physical location is momentarily lost due to an unplanned event. In the event of a failure, site or geographical diversity allows providers to "fail over" to another site with replicated equipment, and thus avoid major service interruptions. Although critical for service availability, site diversity can be costly to be implemented by a single network provider.

Therefore, a need exists for a method and apparatus for enabling disaster recovery using network peering arrangements with other network providers in packet-switched networks, e.g., Voice over Internet Protocol (VoIP) networks.

SUMMARY OF THE INVENTION

In one embodiment, the present invention enables network providers to create peering arrangements with other providers that allow them to fail over to other networks in the event of a site failure. This invention would lower the cost to provide site diversity within a provider's network by allowing cost sharing between the provider's network and other networks. In particular, when an Application Server (AS) in a network fails, the network provider can send a call to a partner's network and uses an AS in the partner's network to process the call request. This allows call control elements (CCE) and border elements (BE) to be diversified in order to reach other networks in the event of a site failure of the AS. Broadly defined, a CCE is a network element that performs call control functions to setup a call, an AS is a network element that comprises the data as well as applications that the CCE needs in order to setup a call, and a Border Element is a network element that represents the edge of a VoIP network and serves as a gateway between a customer's network, a VoIP network, and a Public Switched Telephone Network (PSTN).

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
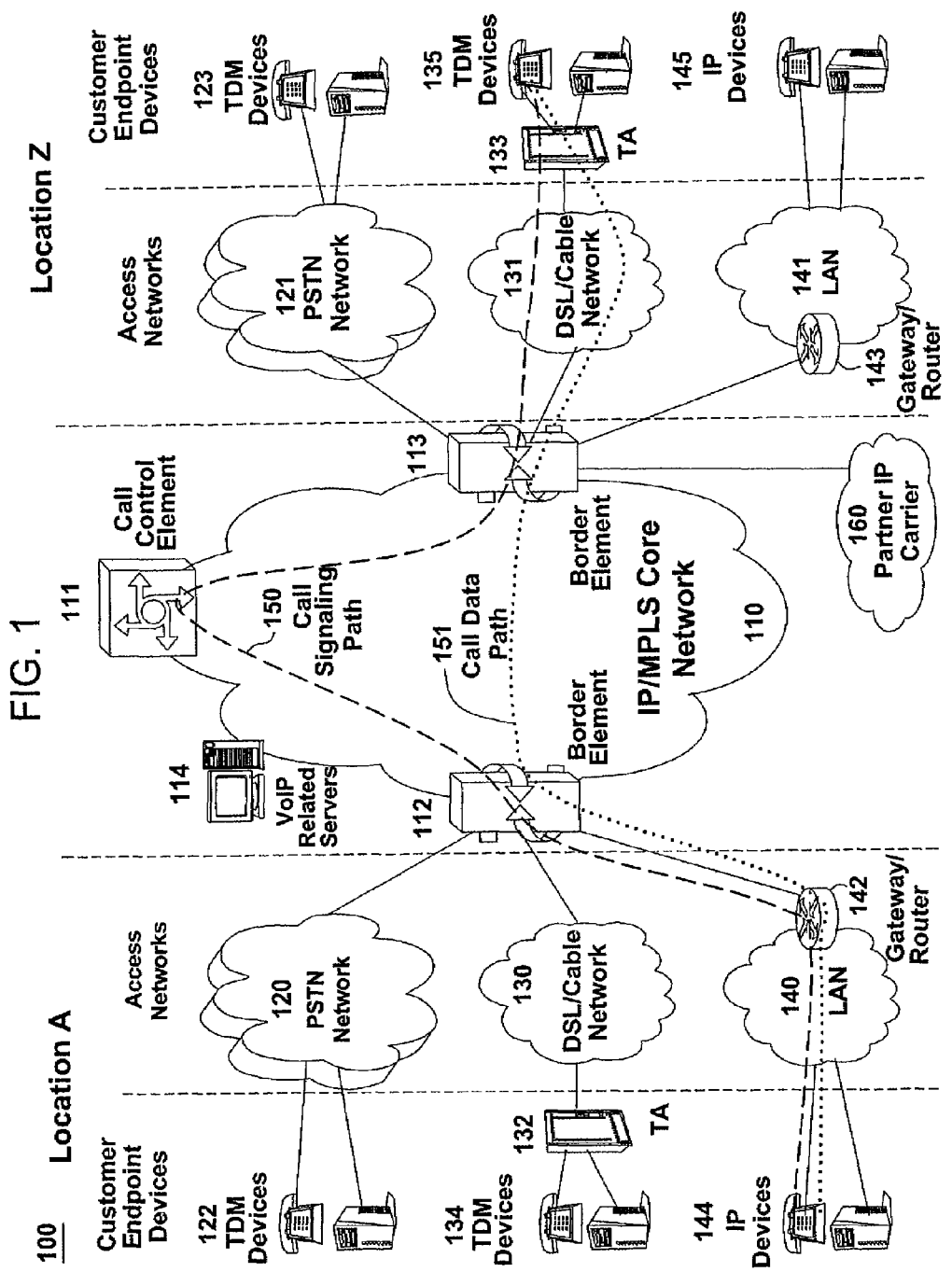
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

To offer highly reliable service availability, network service providers must design their networks to support redundancy among network elements as well as site diversity. Geographical diversity is critical for instances where equipment housed in a physical location is momentarily lost due to an unplanned event. In the event of a failure, site or geographical diversity allows providers to "fail over" to another site with replicated equipment, and thus avoid major service interruptions. Although critical for service availability, site diversity can be costly to be implemented by a single network provider.

To address this need, the present invention enables network providers to create peering arrangements with other providers that allow them to fail over to other networks in the event of a site failure. This invention would lower the cost to provide site diversity within a provider's network by allowing cost sharing between the provider's network and other networks. In particular, when an Application Server (AS) in a network fails, the network provider can send a call to a partner's network and uses an AS in the partner's network to process the call request. This allows call control elements (CCE) and border elements (BE) to be diversified in order to reach other networks in the event of a site failure of the AS. Broadly defined, a CCE is a network element that performs call control functions to setup a call, an AS is a network element that comprises the data as well as applications that the CCE needs in order to setup a call, and a Border Element is a network element that represents the edge of a VoIP network and serves as a gateway between a customer's network, a VoIP network, and a Public Switched Telephone Network (PSTN).

Figure 2:
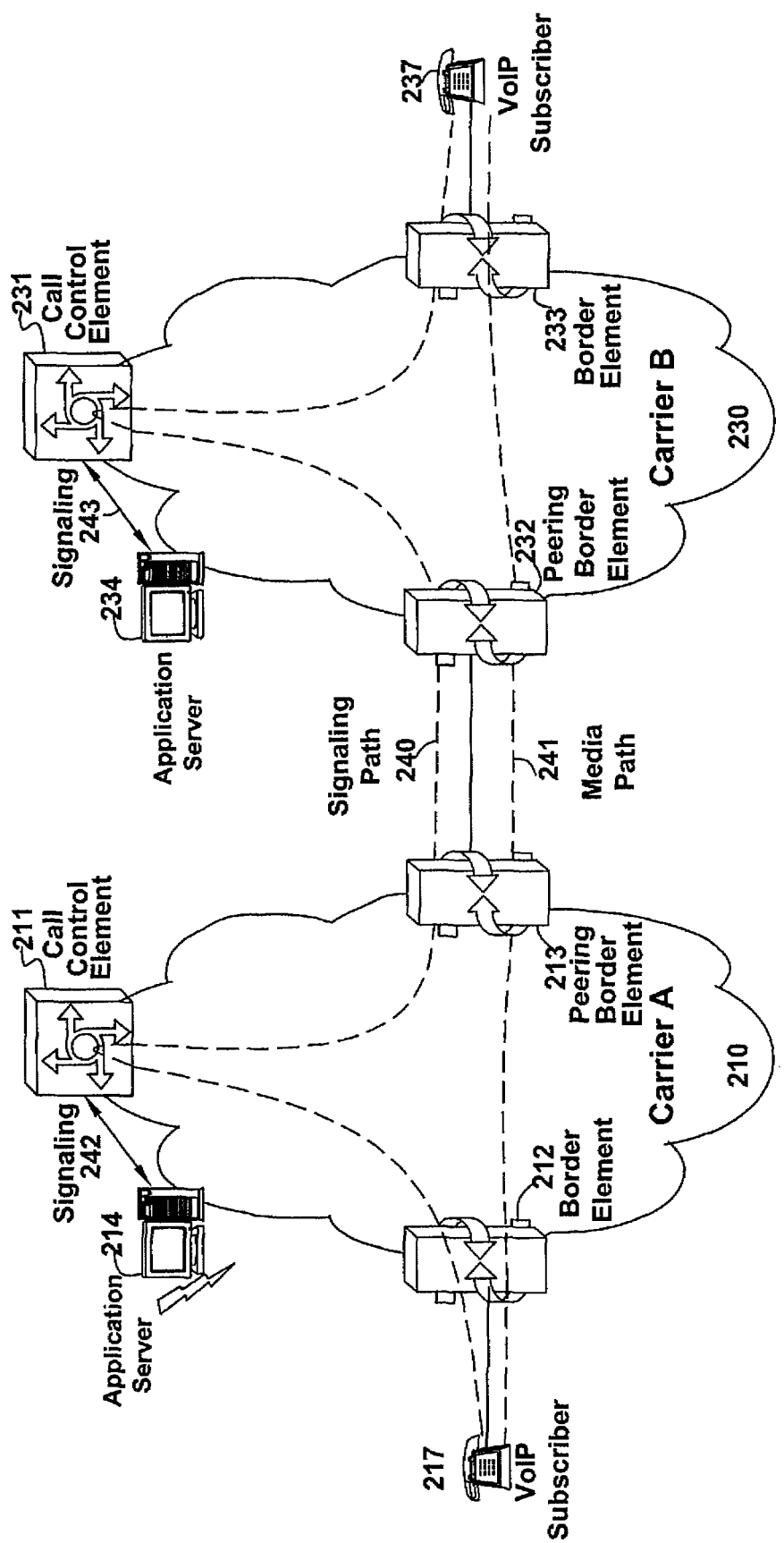
FIG. 2 illustrates an example of enabling disaster recovery using network peering arrangements between two VoIP networks of the present invention.

FIG. 2 illustrates an example of enabling disaster recovery using network peering arrangements between two packet-switched networks, e.g., VoIP networks. FIG. 2 comprises two VoIP carriers, 210 and 230, interconnected by Peering Border Element (PBE) 213 and PBE 232. In order to process calls between the two carriers, CCE 211 in carrier A's network must registers a database of IP addresses of network elements, such as CCE 231 and PBE 232, in carrier B's network and vice versa. Peering Border Element is a Border Element that interconnects two VoIP carrier networks. PBE 213 marks the edge of the network of carrier A and PBE 232 marks the edge of the network of carrier B. VoIP subscriber 217 in carrier A originates a call terminated at the VoIP subscriber 237 using signaling path 240. A call setup message is sent to CCE 211 for call processing. Upon receiving the call setup message, CCE 211 attempts to access Application Server (AS) 214, using flow 242, to retrieve the necessary service logic and application to process the call but AS 214 is unreachable since the site that houses AS 214 is experiencing an unplanned failure event. Therefore, CCE 211 forwards the call to CCE 231 in partner network 230 for the call to be processed. CCE 231, upon receiving the call setup message, access AS 234, flow 243, to retrieve the necessary service logic and application to process the call. The call setup is then completed jointly by CCE 211 and CCE 231 between the calling party 217 and the called party 237 and media path 241 via BE 233, PBE 232, PBE 213 and BE 212 is established to facilitate conversations between the calling and the called party. The present invention requires only CCEs and BEs within carrier A's network to have site diversity in order to reach carrier B's network even when the AS in carrier A is not protected by site diversity. Effectively, carrier B is providing the site diversity of the AS on behalf of carrier A. This allows carrier A not to build diverse site for every single network elements in the network. In this case, site diversity of the AS in carrier A's network is provided by carrier B and hence lowering the overall costs to provide the same high availability and reliability of carrier A's network by sharing costs with carrier B. Of course, carrier B can use carrier A's network for the same purpose to achieve mutual site diversity of AS cost sharing objectives.

Figure 3:
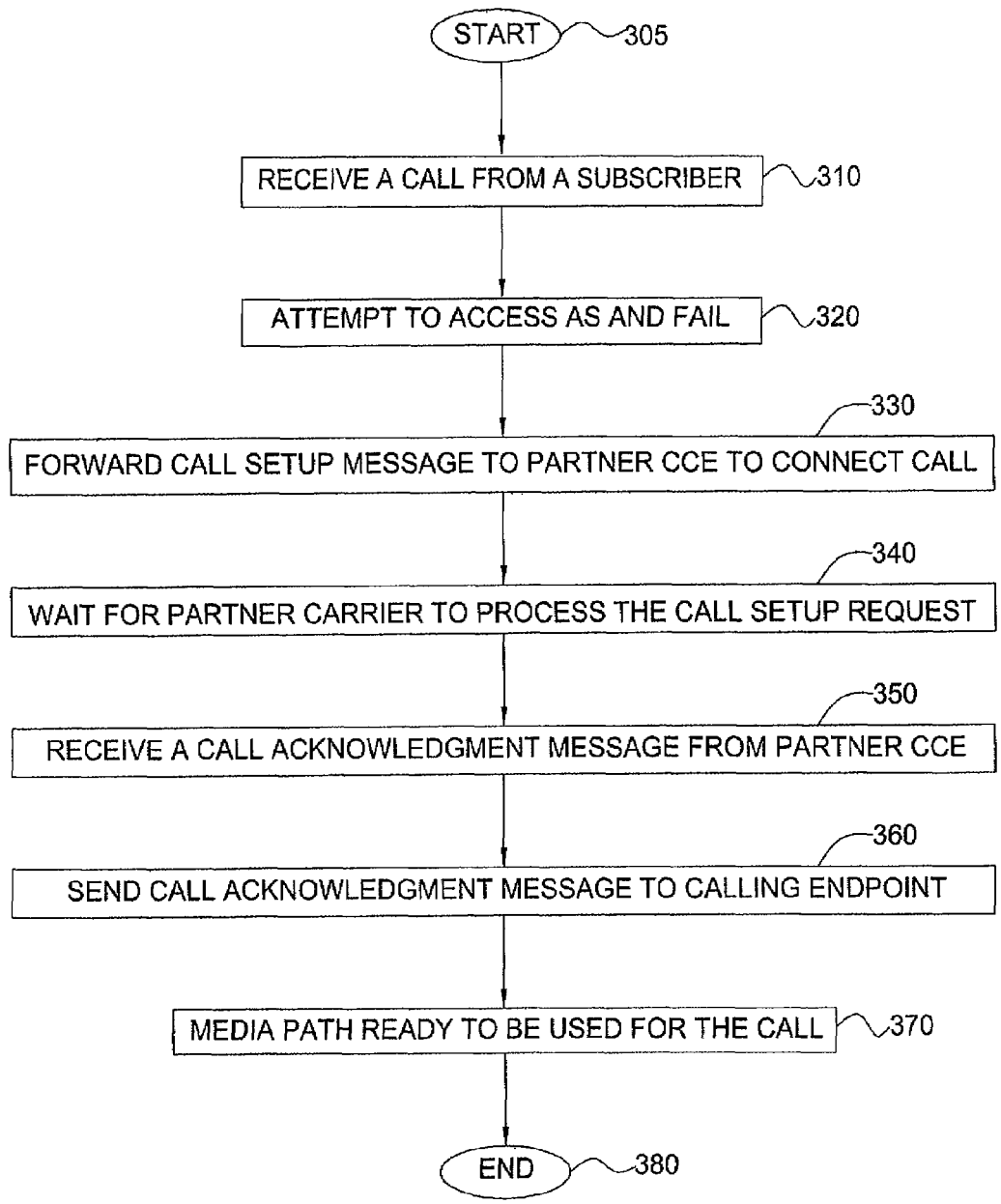
FIG. 3 illustrates a flowchart of a method for enabling disaster recovery using network peering arrangements by the originating carrier between two VoIP networks of the present invention.

FIG. 3 illustrates a flowchart of a method of an example for enabling disaster recovery using network peering arrangements by the originating carrier between two packet-switched networks, e.g., two VoIP networks. Method 300 starts in step 305 and proceeds to step 310.

In step 310, the method receives a call setup message of a call from a VoIP subscriber. In step 320, the method attempts to access a network element, e.g., an AS, to retrieve the needed service logic and application and reveals that the AS is unreachable. In step 330, the method forwards the call setup message to the CCE in the partner's network. In step 340, the method waits for the partner network to process the call. In step 350, the method receives a call acknowledgement message from the partner's network CCE. In step 360, the method sends a call acknowledgement message to the calling VoIP subscriber to complete the call. In step 370, the media path can be used to carry a media stream across the networks to the called number subscriber using the established media path. Method 300 ends in step 380

Figure 4:
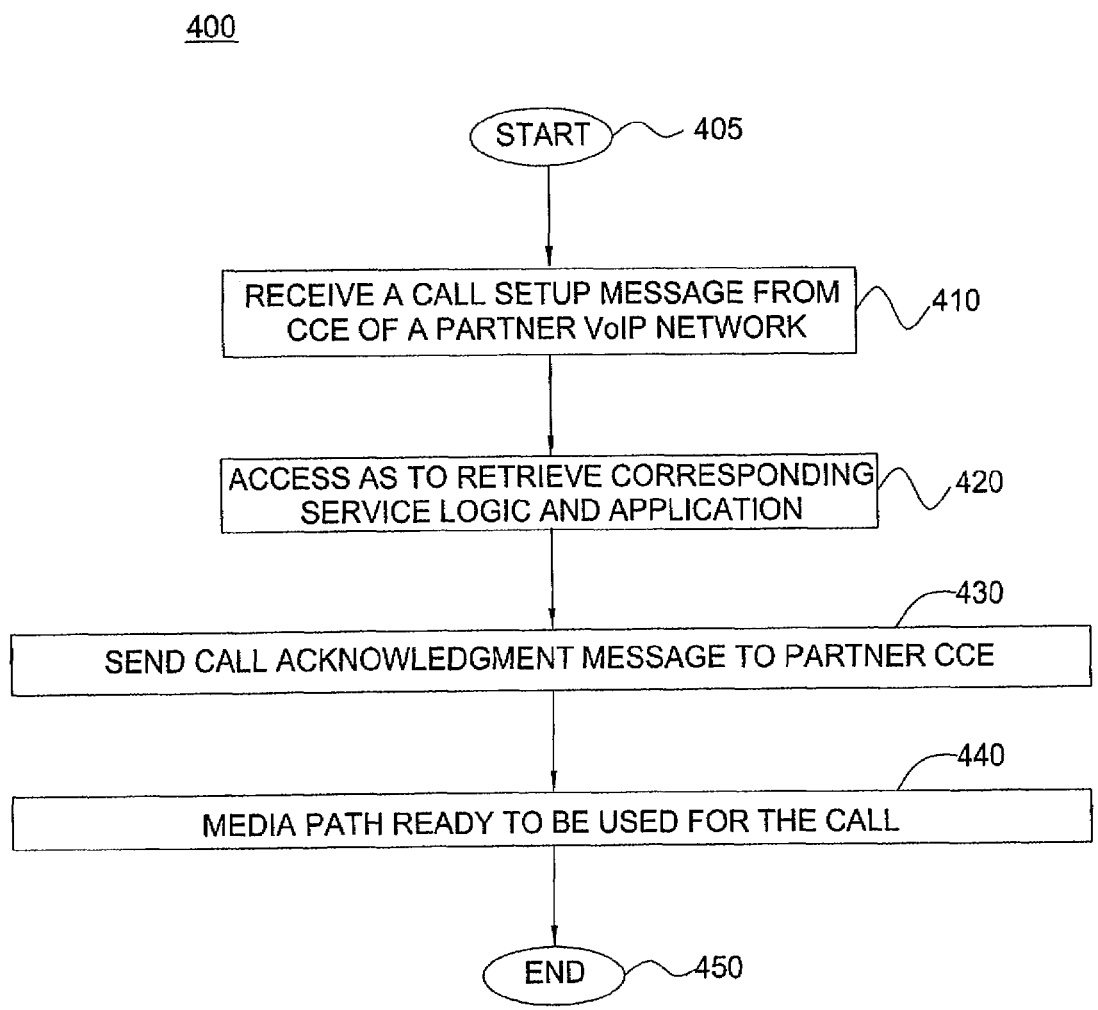
FIG. 4 illustrates a flowchart of a method for enabling disaster recovery using network peering arrangements by the terminating carrier between two VoIP networks of the present invention.

FIG. 4 illustrates a flowchart of a method of an example for enabling disaster recovery using network peering arrangements by the terminating carrier between two packet-switched networks, e.g., two VoIP networks.

Method 400 starts in step 405 and proceeds to step 410.

In step 410, the method receives a call setup message to a called party terminated in its own network. In step 420, the method accesses the AS to retrieve the needed service logic and application to process the call setup request on behalf of the partner's network. In step 430, the method sends a call acknowledgement message back to the originating partner's CCE. In step 440, the media path can be used to carry a media stream across the networks to the called number subscriber using the established media path. Method 400 ends in step 450.

In addition, in order to facilitate billings and call settlements across the two VoIP networks, call transaction records must be exchanged between the two carriers for billing and settlement purposes. The type and format of transaction records to be exchange must be agreed upon by both carriers.

Figure 5:
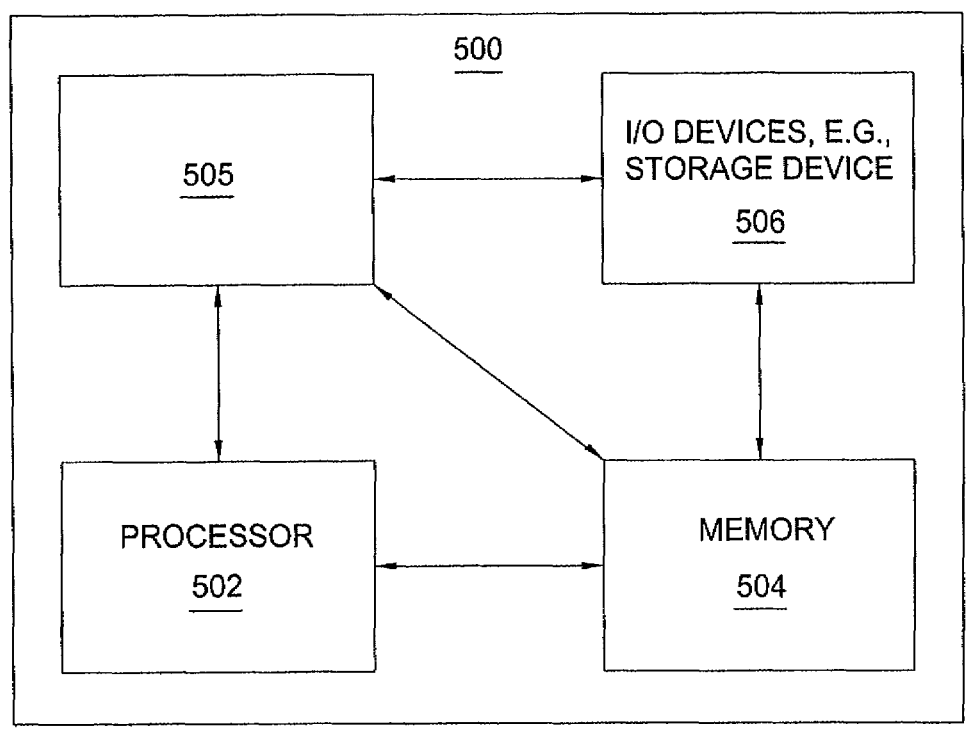
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a disaster recovery peering module 505, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present enabling disaster recovery peering module or process 505 can be loaded into memory 504 and executed by processor 502 to implement the functions as discussed above. As such, the present disaster recovery peering process 505 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a call setup message in a communication network, comprising:
   receiving the call setup message by a processor of a peering network to process the call setup message, when a network element in the communication network is unavailable to process the call setup message; and
   retrieving, by the processor, service logic for processing the call setup message on behalf of the communication network, wherein the call setup message originated from an endpoint device in the communication network for a call that is terminating in the peering network.

2. The method of claim 1, wherein the communication network comprises a voice over Internet protocol network.

3. The method of claim 1, wherein the peering network comprises a voice over Internet protocol network.

4. The method of claim 1, wherein the call setup message is initially received by a first call control element in the communication network.

5. The method of claim 4, wherein the receiving comprises:
   receiving the call setup message from the first call control element, wherein the processor is a processor of a second call control element of the peering network.

6. The method of claim 1, wherein the network element comprises an application server in the communication network.

7. The method of claim 5, further comprising:
   accessing an application server in the peering network by the processor to process the call setup message.

8. The method of claim 1, further comprising:
   maintaining in the communication network a database of Internet protocol addresses of a plurality of network elements of the communication network.

9. The method of claim 1, wherein the communication network and the peering network are operated by different service providers.

10. A non-transitory computer-readable medium storing instructions which, when executed by a processor of a peering network, cause the processor to perform operations for processing a call setup message in a communication network, the operations comprising:
    receiving the call setup message to process the call setup message, when a network element in the communication network is unavailable to process the call setup message; and
    retrieving service logic for processing the call setup message on behalf of the communication network, wherein the call setup message originated from an endpoint device in the communication network for a call that is terminating in the peering network.

11. The non-transitory computer-readable medium of claim 10, wherein the communication network comprises a voice over Internet protocol network.

12. The non-transitory computer-readable medium of claim 10, wherein the peering network comprises a voice over internet protocol network.

13. The non-transitory computer-readable medium of claim 10, wherein the call setup message is initially received by a first call control element in the communication network.

14. The non-transitory computer-readable medium of claim 13, wherein the receiving comprises:
    receiving the call setup message from the first call control element, wherein the processor comprises a processor of a second call control element of the peering network.

15. The non-transitory computer-readable medium of claim 10, wherein the network element comprises an application server in the communication network.

16. The non-transitory computer-readable medium of claim 14, wherein the operations further comprise:
   accessing an application server in the peering network by the processor to process the call setup message.

17. The non-transitory computer-readable medium of claim 10,
   wherein a database of internet protocol addresses of a plurality of network elements of the communication network is maintained in the communication network.

18. The non-transitory computer-readable medium of claim 10, wherein the communication network and the peering network are operated by different service providers.

19. A system for processing a call setup message in a communication network, comprising:
   a processor of a peering network; and
   a computer-readable medium storing instructions which, when executed by the processor, cause the processor to perform operations, the operations comprising:
      receiving the call setup message to process the call setup message, when a network element in the communication network is unavailable to process the call setup message; and
      retrieving service logic for processing the call setup message on behalf of the communication network, wherein the call setup message originated from an endpoint device in the communication network for a call that is terminating in the peering network.

20. The system of claim 19, wherein the communication network comprises a voice over internet protocol network.

* * * * *